United States Patent
Takakura et al.

(10) Patent No.: US 8,185,760 B2
(45) Date of Patent: May 22, 2012

(54) MEMORY CONTROLLER DEVICE, CONTROL METHOD FOR MEMORY CONTROLLER DEVICE AND DATA RECEPTION DEVICE

(75) Inventors: Akihiro Takakura, Kasugai (JP); Shinichiro Ikeda, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 493 days.

(21) Appl. No.: 12/411,085

(22) Filed: Mar. 25, 2009

(65) Prior Publication Data

US 2009/0249110 A1    Oct. 1, 2009

(30) Foreign Application Priority Data

Mar. 26, 2008    (JP) .................................. 2008-80013

(51) Int. Cl.
    *G06F 1/32*    (2006.01)
(52) U.S. Cl. .......................... 713/320; 713/323; 713/324
(58) Field of Classification Search .................. 713/300, 713/320, 323, 324, 600, 601
    See application file for complete search history.

(56) References Cited

U.S. PATENT DOCUMENTS

| | | | |
|---|---|---|---|
| 5,467,455 A * | 11/1995 | Gay et al. ...................... | 710/100 |
| 5,969,551 A | 10/1999 | Fujioka | |
| 6,266,283 B1 | 7/2001 | Fujimori | |
| 6,356,106 B1 * | 3/2002 | Greeff et al. .................... | 326/30 |
| 6,629,225 B2 * | 9/2003 | Zumkehr ...................... | 711/167 |
| 7,257,725 B2 * | 8/2007 | Osaka et al. ................... | 713/500 |
| 2003/0197525 A1 | 10/2003 | Song et al. | |
| 2007/0103188 A1 | 5/2007 | Hosoe et al. | |

FOREIGN PATENT DOCUMENTS

| | | |
|---|---|---|
| JP | 10-336008 A | 12/1998 |
| JP | 2000-195263 A | 7/2000 |
| JP | 2003-347923 A | 12/2003 |
| JP | 2007-115366 A | 5/2007 |

* cited by examiner

*Primary Examiner* — Paul Yanchus, III
(74) *Attorney, Agent, or Firm* — Arent Fox LLP

(57) ABSTRACT

A memory controller device coupled to a memory device equipment including a plurality of memory devices, includes a memory controller configured to instruct read-out of data in the memory device and a physical part configured to terminate a read-out signal for a certain period containing an arrival time of data read out from one memory device of the memory device equipment in accordance with a read-out instruction from the memory controller and excludes a part of a delay time from the read-out instruction until the data read-out of at least one other memory device.

13 Claims, 7 Drawing Sheets

US 8,185,760 B2

MEMORY CONTROLLER DEVICE, CONTROL METHOD FOR MEMORY CONTROLLER DEVICE AND DATA RECEPTION DEVICE

CROSS-REFERENCE TO RELATED APPLICATIONS

This application is based upon and claims the benefit of priority of Japanese Patent Application No. 2008-080013, filed on Mar. 26, 2008, the entire contents of which are incorporated herein by reference.

FIELD

The embodiments discussed herein are related to a memory controller device, a control method for a memory controller device and a data reception device.

BACKGROUND

FIG. 7 shows a memory system 101. The memory system 101 has a memory controller device 102 and a memory device 103. The memory controller device 102 has a memory controller 104 and a physical layer part 105 for receiving/transmitting data. The physical layer part 105 is provided with a data reception circuit 113.

A plurality of SDRAM (Synchronous DRAM) (not shown) are mounted in the memory device 103. A clock supply route to the plurality of SDRAMs in the memory device 103 is constructed by a daisy chain. The memory device 103 and the physical layer part 105 are connected to each other through a clock signal line CW. A clock CK is input through the clock signal line CW and the clock supply route to each of the plurality of SDRAMs. Furthermore, a read command output from the memory controller 104 is input to each of the plurality of SDRAMs through a command signal (not shown) and a command supply route (not shown).

The plurality of SDRAMs in the memory device 103 and the data reception circuit 113 are connected to one another through a strobe signal line SW and a data signal line DW. Data signals DQ output from the plurality of SDRAMs are input to the data reception circuit 113 through the data signal line DW. The data strobe signals DQS output from the plurality of SDRAM are input to the data reception circuit 113 through the strobe signal line SW. The reception data signal RD is output from the data reception circuit 113, and input to the memory controller 104.

An input terminal of the data reception circuit 113 is provided with a terminating resistor (not shown) whose ON/OFF may be controlled. The terminating resistor is used to reduce reflection of an input signal, thereby enhancing waveform quality. The terminating resistor is required to be set to an ON-state during a read period for which data are input from the memory device 103 to the data reception circuit 113.

Furthermore, JP-A-2000-195263, JP-A-2007-115366 and JP-A-10-336008 disclose examples of other memory systems.

The time period from the output time of the read command from the memory controller device 102 to the input time of the data signal DQ and the data strobe signal DQS to the data reception circuit 113 is a round trip time. The round trip time contains a propagation delay time of the clock CK. The clock supply route to the plurality of SDRAMs in the memory device 103 is constructed by the daisy chain, and thus the length of the clock supply route is different for every SDRAM. Accordingly, a time lag occurs in the round trip time among the SDRAMs. To prevent signal line conflict, the period for which the terminating resistor is set to the ON-state is set to a period having a sufficiently larger margin than the actual read period. Accordingly, the occupation time of the signal line is lengthened, causing a drop in bus efficiency.

SUMMARY

According to an aspect of the invention, a memory controller device coupled to a memory device equipment including a plurality of memory devices, includes a memory controller configured to instruct read-out of data in the memory device and a physical part configured to terminate a read-out signal for a certain period containing an arrival time of data read out from one memory device of the memory device equipment in accordance with a read-out instruction from the memory controller but not a part of a delay time from the read-out instruction until the data read-out of at least one other memory device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates a detailed circuit diagram of a clock generating circuit 15, a delay circuit 11a and a data reception circuit 13a;

DESCRIPTION OF EMBODIMENTS

An embodiment according to a memory system 1 will be described with reference to FIGS. 1 to 4.

Figure 1:
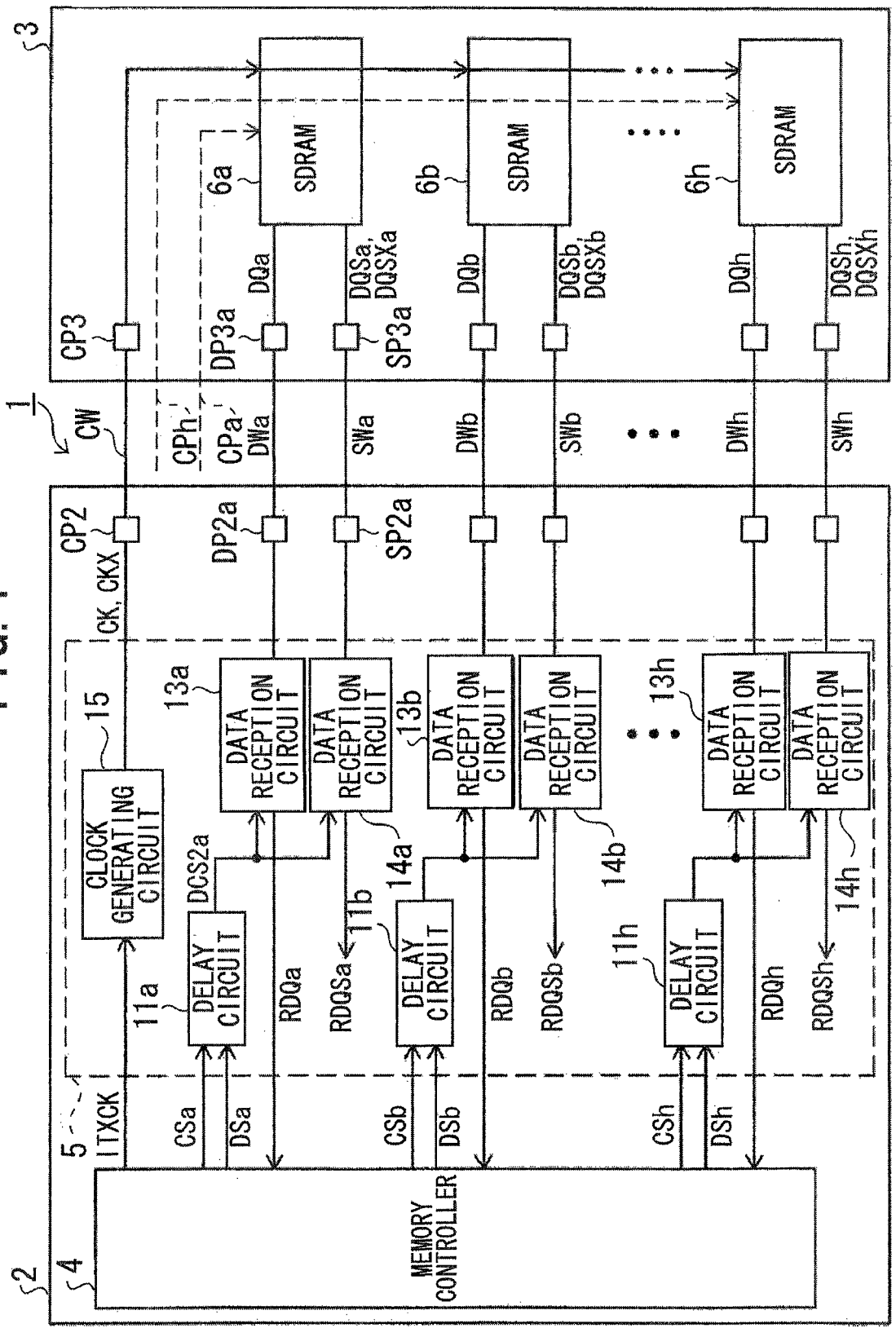
FIG. 1 illustrates a circuit diagram of a memory system 1.

FIG. 1 is a circuit diagram showing the memory system 1 according to this embodiment. The memory system 1 has a memory controller device 2 and a memory device 3. The memory device 3 has SDRAM 6a to 6h. The terminal CP 3 of the memory device 3 is connected to the terminal CP2 of a memory controller device 2 through a clock signal line CW. The memory device 3 is a memory device based on DDR3 standard and a flyby architecture is adopted. In this architecture, SDRAMs 6a to 6h are connected to the terminal CP3 in the daisy-chain connection style. A clock CK and a reversed-phase clock CKX are input to the terminal CP3. A data strobe signal DQSa and DQSXa are output from DRAM 6a, and input to the terminal SP3a. A data signal DQa is output from SDRAM 6a and input to the terminal DP3a. The structure of SDRAMs 6b to 6h are the same as SDRAM 6a, and thus the detailed description thereof is omitted.

The memory controller device 2 has a memory controller 4 and a physical layer part 5. The physical layer part 5 is a circuit used for data transmission/reception to/from the memory controller 4 and the memory device 3. The physical layer part 5 is provided with a clock generating circuit 15, delay circuits 11a to 11h, data reception circuits 13a to 13h and data reception circuits 14a to 14h. A clock ITXCK is input from the memory controller 4 into the clock generating circuit 15. A clock CK and a reversed-phase clock CKX output from the clock generating circuit 15 are input to the terminal CP2. An ODT control signal CSa and a delay control signal DSa are input to the delay circuit 11a, and a second delay ODT control signal DCS2a is output from the delay circuit 11a. The second delay ODT control signal DCS2a is input to the data reception circuits 13a and 14a.

The terminal DP2a is connected to the data reception circuit 13a. The terminal DP2a is connected to the terminal DP3a of the memory device 3 through a data signal line DWa. A data signal DQa is input from SDRAM 6a to the data reception circuit 13a, and a reception data signal RDQa is output from the data reception circuit 13a. The terminal SP2a is connected to the data reception circuit 14a. The terminal SP2a is connected to the terminal SP3a of the memory device 3 through a strobe signal line SWa. Data strobe signals DQSa and DQSXa are input from SDRAM 6a are input to the data reception circuit 14a, and a reception data strobe signal RDQSa is output from the data reception circuit 14a.

The structure of the delay circuits 11b to 11h are the same as the delay circuit 11a. The structure of the data reception circuits 13b to 13h are the same as the data reception circuit 13a, and the structure of the data reception circuits 14b to 14h are the same as the data reception circuit 14a. Accordingly, the detailed description thereof is omitted from the following description. The physical layer part 5 also has a circuit for transmitting the read command output from the memory controller 4, etc. to the memory device 3. The structure of the circuit is the same as the clock generating circuit 15, and thus the detailed description thereof is omitted.

Figure 2:
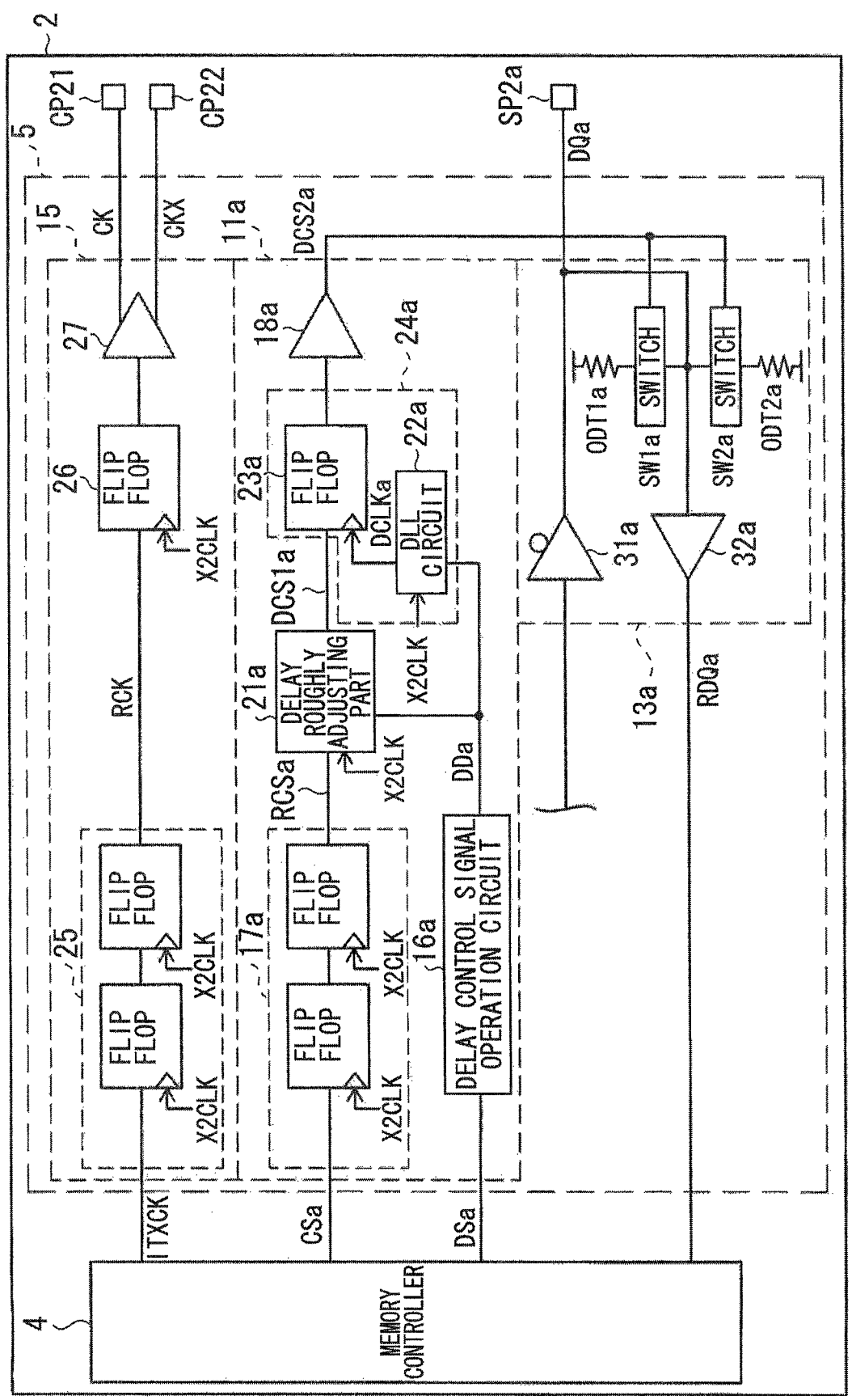

FIG. 2 shows a detailed internal circuit of the clock generating circuit 15, the delay circuit 11a and the data reception circuit 13a. The clock generating circuit 15 includes a latency part 25, a flip flop 26 and a driver 27. The latency part 25 of the clock generating circuit 15 includes two flip flops to which an internal clock X2CLK is input, and which are connected to each other in series at two stages. A clock ITXCK is input to the latency part 25, and a clock RCK to which a predetermined latency is provided is output from the latency part 25. The clock RCK and the internal clock X2CLK are input to the flip flop 26. A clock CK and a reversed-phase clock CKX are output from the flip flop 26 through the driver 27. The clock CK is input to the terminal CP21, and the reversed-phase clock CKX is input to the terminal CP22.

The delay circuit 11a has a latency part 17a, a delay control signal operation circuit 16a, a delay roughly adjusting part 21a, a delay minutely adjusting part 24a and a dummy driver 18a. The latency part 17a includes two-stage flip flops to which an internal clock X2CLK is input, and which are connected to each other in series. An ODT control signal CSa is input to the latency part 17a, and a first ODT control signal RCSa to which a predetermined latency is provided is output from the latency part 17a. A delay control signal DSa is input to the delay control signal operation circuit 16a, and a delay amount signal DDa is output from the delay control signal operation circuit 16a. The first ODT control signal RCSa, the delay amount signal DDA and the internal clock X2CLK are input to the delay roughly adjusting part 21a, and a first delay ODT control signal DCS 1a is output from the delay roughly adjusting part 21a. The delay minutely adjusting part 24a has a DLL circuit 22a and a flip flop 23a. The internal clock X2CLK and the delay amount signal DDa are input to the DLL circuit 22a, and a delay clock DCLKa is output from the DLL circuit 22a. The first delay ODT control signal DCS1a and the delay clock DCLKa are input to the flip flop 23a. A second delay ODT control signal DCS2a is output from the flip flop 23a through a dummy driver 18a, and it is input to the data reception circuit 13a.

The data reception circuit 13a has a driver cell 31a, a receiver cell 32a, terminating resistors ODT1a and ODT2a and switches SW1a and SW2a. Predetermined potential is supplied to the input terminal of the receiver cell 32a through the switch SW1a and the terminating resistor ODT1a, and predetermined potential is also supplied to the input terminal of the receiver cell 32a through the switch SW2a and the terminating resistor ODT2a. A data signal DQa is input to the input terminal of the receiver cell 32a. A second delay ODT control signal DCS2a is input to the switches SW1a and SW2a. A reception data signal RDQa is output from the receiver cell 32a, and input to the memory controller 4.

Next, the operation of the memory system 1 according to the present invention will be described with reference to the timing chart of FIG. 3. First, the description will be made by applying this embodiment to a case where data are read out from SDRAM 6a of the memory device 3 (FIG. 1). This case corresponds to a case where the round trip time is minimal. At a time t1 of FIG. 3, the read command RCMD is output from a circuit (not shown) of the physical layer part 5, and input to SDRAM 6a together with the clock CK. After a round trip time RTTa elapses from the time t1, the data strobe signal DQSa and the data signal DQa are input from SDRAM 6a to the physical layer part 5. Here, the round trip time RTTa corresponds to the sum of the following three delay times: (1) a delay time of the clock CK in a clock route CPa (FIG. 1) extending from the memory controller device 2 to SDRAM 6a, (2) an internal delay time of SDRAM 6a during the time period from the input of the read command RCMD and the clock CK into SDRAM 6a until the read-out of the data strobe signal DQSa and the data signal DQa, and (3) a delay time of the data signal DQa at the data signal line DWa and a delay time of the data strobe signal DQSa at the strobe signal line SWa.

The operation in the delay circuit 11a will be described. The delay circuit 11a is a circuit for delaying the first ODT control signal RCSa in conformity with the round trip time RTTa. The delay control signal DSa is input from the memory controller 4 to the delay control signal operation circuit 16a in accordance with the output of the read command RCMD at the time t1 of FIG. 3. The round trip time RTTa of SDRAM 6a is held in advance in the delay control signal operation circuit 16a. The delay control signal operation circuit 16a outputs the delay amount signal DDa in accordance with the input delay control signal DSa. Here, the delay amount signal DDa is a signal for instructing the delay roughly adjusting part 21a and the delay minutely adjusting part 24a to provide the first ODT control signal RCSa with the delay amount corresponding to the round trip time RTTa. A simulation method may be adopted as a method of determining the round trip time RTTa in advance, for example.

The delay roughly adjusting part 21a is a rough adjustment circuit for adjusting a delay amount of a half cycle or more of the internal clock X2CLK. The delay roughly adjusting part 21a provides the delay corresponding to the delay amount signal DDa to the first ODT control signal RCSa, and outputs the delay result as the first delay ODT control signal DCS1a. The first delay ODT control signal DCS1a is input to the delay minutely adjusting part 24a.

The delay minutely adjusting part 24a is a minute adjustment circuit for adjusting a delay amount which is smaller than the half cycle of the internal clock X2CLK. The DLL circuit 22a provides the delay corresponding to the delay amount signal DDa to the internal clock X2CLK, and outputs it as the delay clock DCLKa. The flip flop 23a provides the delay corresponding to the delay clock DCLKa to the first delay ODT control signal DCS1a, and outputs it as the second delay ODT control signal DCS2a.

Figure 3:
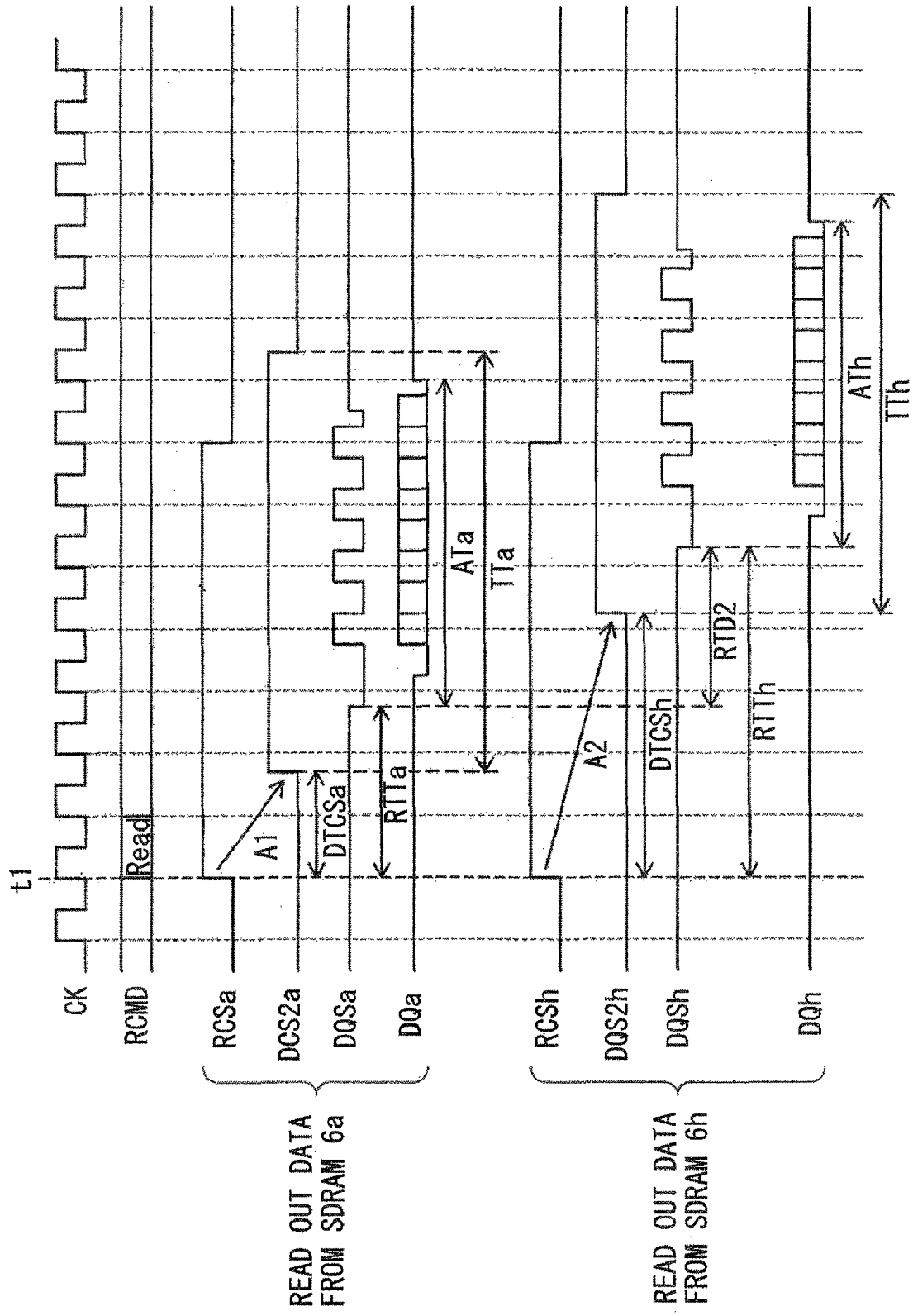
FIG. 3 illustrates a timing chart of the operation of the memory system 1.

The delay time DTCSa corresponding to the round trip time RTTa is provided to the first ODT control signal RCSa by the delay roughly adjusting part 21a and the delay minutely adjusting part 24a as described above, thereby generating the second delay ODT control signal DCS2a (FIG. 3, an arrow A1).

The second delay ODT control signal DCS2a is input to the switches SW1a and SW2a of the data reception circuit 13a through the dummy driver 18a. The switches SW1a and SW2a are set to a conduction state at a terminating term TTa for which the second delay ODT control signal DCS2a is set to a high level. Accordingly, the terminating processing is carried out at the terminating term TTa at the data reception circuit 13a.

Secondly, the following description will be made by applying this embodiment to a case where data are read out from SDRAM 6h. This case corresponds to a case where the round trip time is maximum. At the time t1 of FIG. 3, the read command RCMD is output from a circuit (not shown) of the physical layer part 5, and input to SDRAM 6h together with the clock CK. In this case, after a round trip time RTTh elapses from the time t1, the data strobe signal DQSh and the data signal DQh are input from SDRAM 6h to the physical layer part 5. Here, the round trip time RTTh corresponds to the following three delay times; (1) a delay time of the clock CK in the clock route CPh (FIG. 1) extending from the memory controller device 2 to SDRAM 6h, (2) an internal delay time in SDRAM 6h, and (3) a delay time of the data signal DQh at the data signal line DWh and a delay time of the data strobe signal at the strobe signal line SWh.

Here, a round trip time difference RTD2 occurs between the round trip times RTTa and RTTh. This is because the clock supply route to SDRAMs 6a to 6h is constructed by the daisy chain and thus a difference in route length exists between the clock routes CPa and CPh. The length of the clock route CPa is shortest, and the length of the clock route CPh is longest, so that the round trip time difference RTD2 is the maximum value of the difference between SDRAMs in the round trip time.

The delay time DTCSh corresponding to the round trip time RTTh is provided to the first ODT control signal RCSh by the delay circuit 11h, whereby the second delay ODT control signal DCS2h is generated (FIG. 3, an arrow A2). The process of generating the second delay ODT control signal DCS2h is the same as the process of generating the second delay ODT control signal DCS2a as described above, and thus the description thereof is omitted. The second delay ODT control signal DCS2h is input to the data reception circuit 13h. In the data reception circuit 13h, the terminating processing is executed at the terminating period TTh for which the second delay ODT control signal DCS2h is set to a high level.

As described above, the value of the terminating period TTa is set to a small value which is matched with the arrival period Ata of one SDRAM 6a. The value of the terminating term TTh is set to a small value which is matched with the arrival period ATh of one SDRAM 6h. When data are read out from the SDRAM 6a, the value of the delay time DTCSa is adjusted in accordance with the value of the round trip time RTTa so that the terminating period TTa contains the overall arrive period Ata. Furthermore, when data are read out from SDRAM 6h, the value of the delay time DTCSh is adjusted in accordance with the value of the round trip time RTTh so that the terminating period TTh contains the overall arrival period ATh. Accordingly, even when a round trip time difference RTD2 exists, the ON/OFF timing of the terminating resistor may be set so that the terminating processing is executed within the period of the terminating periods TTa and TTb having small values. The adjusting operation of the delay time when data are read out from SDRAMs 6b to 6g is the same as described above, and thus the detailed description thereof is omitted.

The delay time DTCSa provided to the second delay ODT control signal DCS2a is given with the clock CK set as a reference, and thus it is required to match the clock CK and the second delay ODT control signal DCS2a in phase as much as possible. In the memory controller device 2 of this embodiment, the latency part 25 and the latency part 17a are designed to have the same circuit construction. Accordingly, the latency provided to the clock ITXCK by the latency part 25 is identical to the latency provided to the ODT control signal CSa by the latency part 17a. The driver 27 and the dummy driver 18a are designed to have the same circuit construction. Accordingly, the delay amount provided to the clock CK by the driver 27 is identical to the delay amount provided to the second delay ODT control signal DCS2a by the dummy driver 18a. Accordingly, the clock CK and the second delay ODT control signal DCS2a may be matched with each other in phase, so that the delay time DTCSa may be more accurately controlled.

Figure 4:
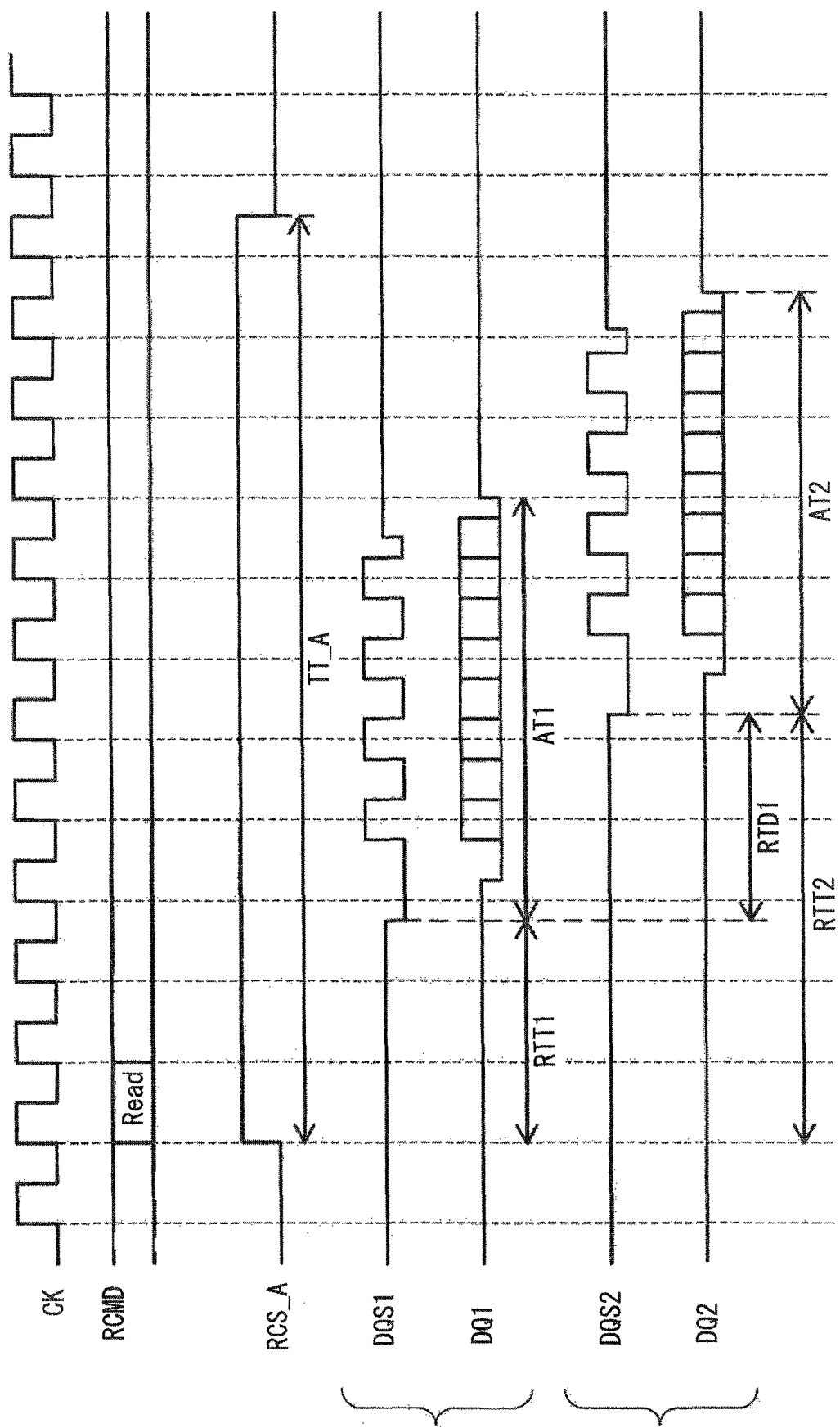
FIG. 4 illustrates a timing chart showing a comparative operation.
Figure 7:
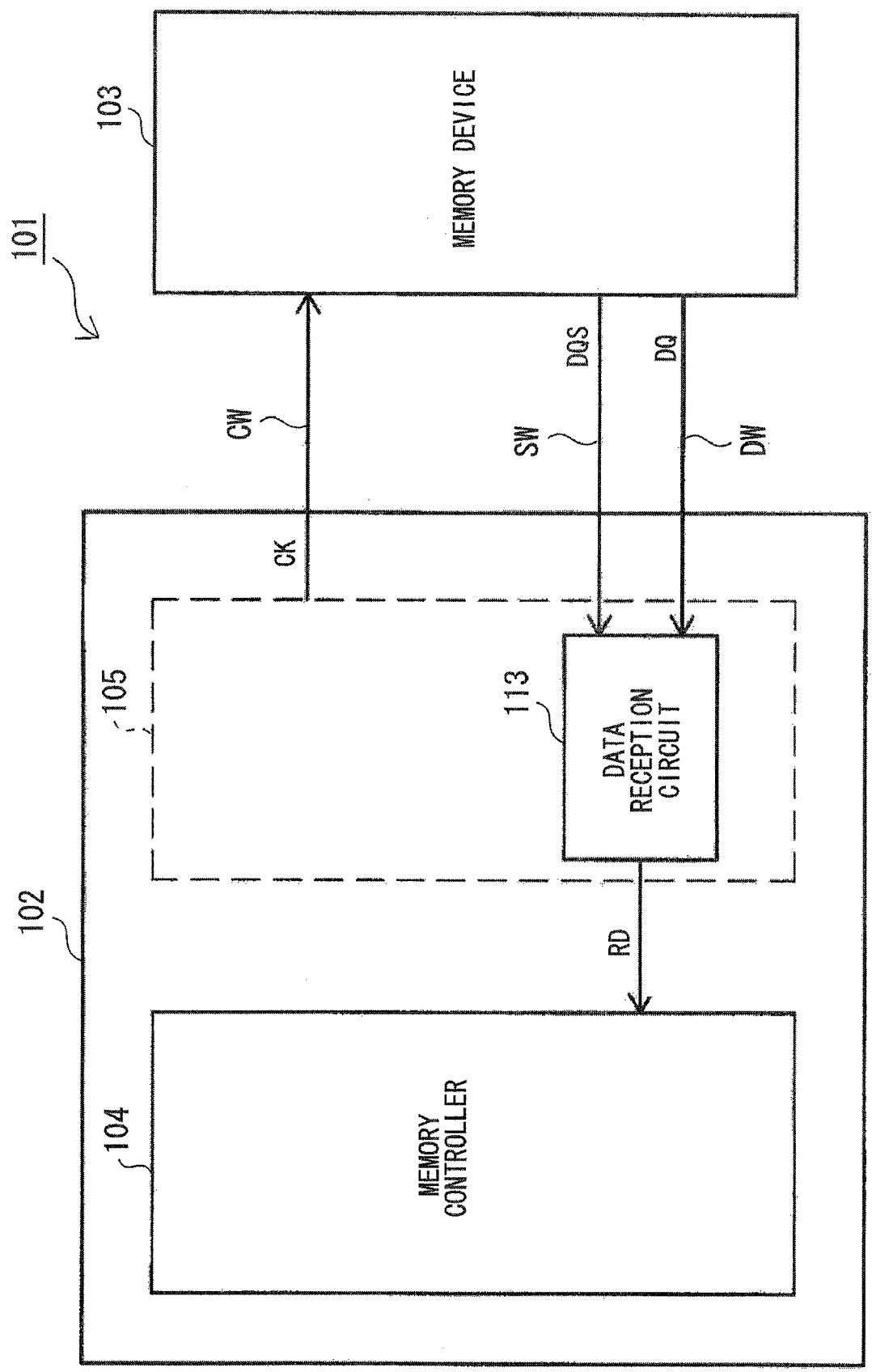
FIG. 7 illustrates a circuit diagram of a conventional memory.

For comparison, a description will be given of a case where, in the circuit of FIG. 7, the terminating period for which the terminating process is executed is set to a large value having a margin with respect to the arrival period for which data arrives from SDRAM. FIG. 4 shows a timing chart. FIG. 4 shows a case where the data signal DQ1 having the minimum round trip time RTT1 and the data strobe signal DQS1 are input to the data reception circuit 113 and a case where the data signal DQ2 having the maximum round trip time RTT2 and the data strobe signal DQS2 are input to the data reception circuit 113. A round trip time difference RTD1 exists between the start point of the arrival period AT1 for which the data strobe signal DQS1 is input and the start point of the arrival period AT2 for which the data strobe signal DQS2 is input.

The terminating period TT_A of the ODT control signal RCS_A is set so that the overall arrival period AT1 and the overall arrival period AT2 are contained in the terminating period TT_A. In other words, the terminating period TT_A is set to a large value having a margin so as to contain the overall period of the round trip time difference RTD1 corresponding to the difference between the round trip times RTT1 and RTT2.

Accordingly, even when the round trip time varies within the range between the round trip times RTT1 and RTT2, the terminating process may certainly be executed during the data arrival periods AT1 and AT2. However, during the terminating period TT_A of a large value having a margin, the data signal line DW and the strobe signal line SW are occupied and data transmission efficiency is decreased.

However, in the memory system 1 of this embodiment, as shown in FIG. 3, the terminating period TTh when the round trip time is maximum (when data are read out from SDRAM 6h) is set so as not to contain the overall round trip time RTTa. In other words, the terminating period TTh is set so that a part of the round trip time difference RTD2 corresponding to the difference between the round trip times RTTa and RTTh is not contained in the terminating period TTh. Accordingly, the length of the terminating period TTh is set to a small value so that it contains the overall arrival period ATh, but does not contain a part of the arrival period Ata.

The terminating period TTa when the round trip time is minimum (when data are read out from SDRAM 6a) is set so as not to contain a part of the round trip time RTTh. Accordingly, the length of the terminating period TTa is set to a small value so that it contains the overall arrival period Ata, but does not contain a part of the arrival period ATh.

As described above, in the memory system 1 of this embodiment, the start point of each of the terminating periods TTa to TTh is adjusted in accordance with the value of each of the round trip times RTTa to RTTh, whereby each of the data arrival periods Ata to ATh may be certainly contained in each of the terminating periods TTa to TTh. Accordingly, the signal line is occupied during only the terminating periods TTa to TTh having a small value, so that the data transfer efficiency may be prevented from being lowered.

The present invention is not limited to the above embodiment, and various kinds of improvements and modifications may be made without departing from the subject matter of the present invention.

In this embodiment, the physical layer part 5 is provided with the delay control signal operation circuits 16a to 16h. That is, the round trip time of each SDRAM is held in the physical layer part 5. However, the present invention is not limited to this embodiment, and the round trip time may be held in parts other than the physical layer part 5. For example, the round trip time of each SDRAM may be held in the memory controller 4. In this case, each of the delay amount signals DDa to DDh are output from the delay control signal operation circuit provided to the memory controller 4, and input to each of the delay circuits 11a to 11h.

Figure 5:
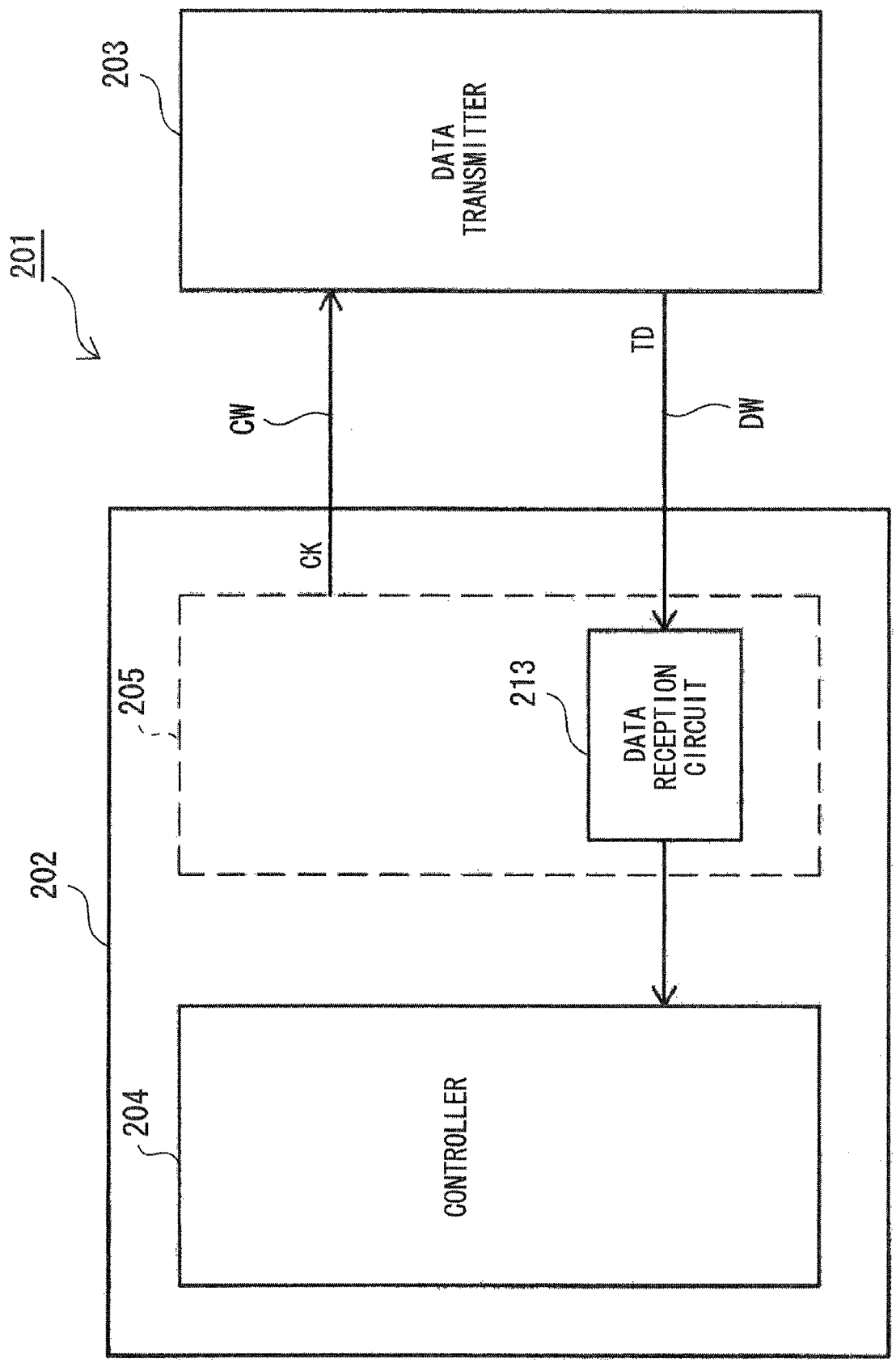
FIG. 5 illustrates a circuit diagram of a data transmission/reception system 201.

In this embodiment, the memory system 1 is described. However, the system to which the present invention is applied is not limited to the memory system. For example, the present invention may be applied to the data transmission/reception system 201 as shown in FIG. 5. The data transmission/reception system 201 has a data reception device 202 and a data transmitter 203. The data reception device 202 has a controller 204 and a physical layer part 205. The physical layer part 205 is provided with a data reception circuit 213. Plural data transmission devices for transmitting data to the data reception device 202 are mounted in the data transmitter 203. The data transmitter 203 and the physical layer part 205 are connected to each other through the clock signal line CW. The clock supply route to the plural data transmission devices in the data transmitter 203 is constructed by the daisy chain. A clock CK is input to each of the plural data transmission devices through the clock signal line CW and the clock supply route. Transmission data TD output from the data transmission device in the data transmitter 203 is input to the data reception circuit 213 through the data signal line DW. A terminating resistor (not shown) whose ON/OFF may be controlled is provided to the input terminal of the data reception circuit 213.

Here, a difference between data transmission devices exists in the round trip time of the transmission data TD. However, the data transmission/reception system 201 has a function of adjusting the start point of the terminating period TT in accordance with the value of the round trip time as in the case of the memory system 1 according to this embodiment. Accordingly, even when a difference (lag) between data transmission devices exists in the round trip time, the terminating processing may certainly be executed within the arrival period of the transmission data TD. The detailed method of adjusting the start point of the terminating period is the same as the memory system 1 of this embodiment, and thus the description thereof is omitted.

Figure 6:
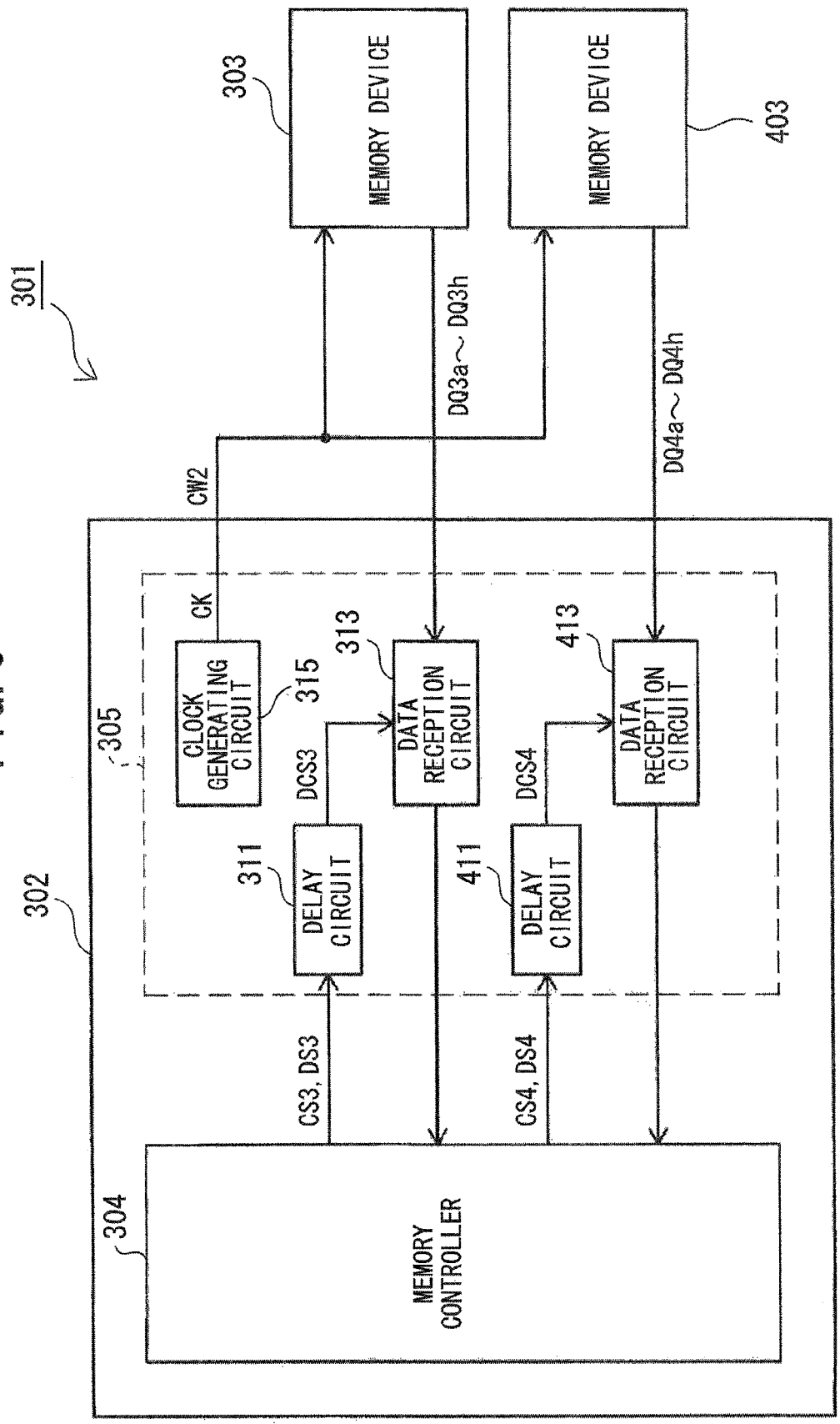
FIG. 6 illustrates a circuit diagram of a memory system 301.

Furthermore, in this embodiment, the memory system has one memory device. However, the present invention is not limited to this embodiment, and it may be provided with plural memory devices. For example, a memory system 301 as shown in FIG. 6 may be used. The memory system 301 has a memory controller device 302 and memory devices 303 and 403. The memory controller device 302 has a memory controller 304 and a physical layer part 305. A clock generating circuit 315 of the physical layer part 305 and memory devices 403 and 404 are connected to each other through a common clock signal line CW2. The clock CK output from the clock generating circuit 315 is commonly input to the memory devices 303 and 403. An ODT control signal CS3 and a delay control signal DS3 are input to a delay circuit 311. The delay circuit 311 provides the delay time corresponding to the value of the round trip time to the ODT control signal CS3, and outputs it as a second delay ODT control signal DCS3. The second delay ODT control signal DCS3 and the data signals DQ3a to DQ3h are input to the data reception circuit 313. An ODT control signal CS4 and a delay control signal DS4 are input to the delay circuit 411. The delay circuit 411 provides the ODT control signal CS4 with the delay time corresponding to the value of the round trip time, and outputs it as a second delay ODT control signal DCS4. The second delay ODT control signal DCS4 and the data signals DQ4a to DQ4h are input to the data reception circuit 413. The detailed circuit construction and operation are the same as the memory system 1 according to this embodiment, and thus the description thereof is omitted.

Accordingly, the terminating process corresponding to the memory device 303 in the data reception circuit 313 and the terminating process corresponding to the memory device 403 in the data reception circuit 413 may be executed in parallel to each other. Accordingly, the reduction of the data transfer efficiency may be prevented in both the memory devices 303 and 403. The number of the memory devices provided to the memory system is not limited to two, as three or more memory devices may be provided.

SDRAMs 6a to 6h are examples of the memory device, the memory device 3 is an example of the memory device equipment, the memory controller device 2 is an example of the memory controller device, the physical layer part 5 is an example of a physical part, the round trip times RTTa to RTTh are examples of the delay time, the delay circuits 11a to 11h are examples of a setting part, the ODT control signals CSa and CSh are examples of the control signal, the internal clock X2CLK is an example of a first clock, the delay roughly adjusting part 21a is an example of a first adjusting part, the delay minutely adjusting part 24a is an example of a second adjusting part, the data reception circuits 13a to 13h and the data reception circuits 14a to 14h are examples of a terminating part, and the latency part 17a and the dummy driver 18a are examples of a dummy clock circuit part.

All examples and conditional language recited herein are intended to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A memory controller device coupled to a memory device equipment including a plurality of memory devices, the memory controller device comprising:
    a memory controller configured to instruct read-out of data in the memory device equipment; and
    a physical part configured to terminate a read-out signal for a certain period containing an arrival time of data read out from one memory device of the memory device equipment in accordance with a read-out instruction from the memory controller and excluding a part of a delay time from the read-out instruction until the data read-out of at least one other memory device,
    wherein the physical part comprises read-out time information for each of the plurality of memory devices,
    wherein the physical part comprises a setting part configured to set a start point of the certain period based at least in part on the read-out time information,
    wherein the read-out time information is the delay time of each of the plurality of memory devices, the memory controller outputs a control signal for indicating the certain period, and the setting part delays the control signal input from the memory controller in accordance with the value of the delay time, and
    wherein the physical part comprises a first clock, and the setting part has a first adjusting part configured to provide the control signal with a delay amount of a half period or more of the first clock and a second adjusting part configured to provide the control signal with a delay amount smaller than the half period of the first clock.

2. A memory controller device according to claim 1, wherein the physical part comprises a terminating part configured to connect a terminal, to which the data is input, to a terminating resistor in accordance with the control signal delayed by the setting part.

3. The memory controller device according to claim 1, wherein the setting part increases the delay amount of the control signal in accordance with increase of the delay time, and reduces the delay amount of the control signal in accordance with decrease of the delay time.

4. A memory controller coupled to a memory device equipment including a plurality of memory devices, the memory controller device comprising:
    a memory controller configured to instruct read-out of data in the memory device equipment; and
    a physical part configured to terminate a read-out signal for a certain period containing an arrival time of data read out from one memory device of the memory device equipment in accordance with a read-out instruction from the memory controller and excluding a part of a delay time from the read-out instruction until the data read-out of at least one other memory device,
    wherein the physical part comprises read-out time information for each of the plurality of memory devices,
    wherein the physical part comprises a setting part configured to set a start point of the certain period based at least in part on the read-out time information,
    wherein the read-out time information is the delay time of each of the plurality of memory devices, the memory controller outputs a control signal for indicating the certain period, and the setting part delays the control signal input from the memory controller in accordance with the value of the delay time, and
    wherein the physical part comprises a dummy clock circuit part configured to provide a clock delay to the control signal input from the memory controller and supplies the memory device equipment with the control signal which is provided with the clock delay.

5. The memory controller device according to claim 4, wherein the setting part increases the delay amount of the control signal in accordance with increase of the delay time, and reduces the delay amount of the control signal in accordance with decrease of the delay time.

6. The memory controller according to claim 4, wherein the physical part comprises a terminating part configured to connect a terminal, to which the data is input, to a terminating resistor in accordance with the control signal delayed by the setting part.

7. A method of controlling a memory controller device being connectable to a memory device equipment including a plurality of memory devices, the method comprising:
    terminating a read-out signal for a certain period containing an arrival time of data read out from one memory device of the memory device equipment in accordance with a read-out instruction and excluding a part of a delay time from the read-out instruction until the data read-out of at least one other memory device;
    setting a start point of the certain period based at least in part on read-out time information for each of the plurality of memory devices, the read-out time information being the delay time of each of the plurality of memory devices;
    outputting a control signal for indicating the certain period;
    delaying the control signal input from the memory controller in accordance with the value of the delay time;
    providing the control signal with a delay amount of a half period or more of a first clock; and
    providing the control signal with a delay amount smaller than the half period of the first clock.

8. A data reception device being connectable to a data transmission equipment including a plurality of data transmitters, the data reception device comprising:
    a data reception controller configured to instruct read-out of data of the data transmission equipment; and
    a physical part configured to terminate a read-out signal for a certain period containing an arrival time of data read out from one data transmitter of the data transmission equipment in accordance with a read-out instruction from the data reception controller but not a part of a delay time from the read-out instruction until the data read-out of at least one other data transmission device,
    wherein the physical part comprises read-out time information for each of the plurality of data transmitters,
    wherein the physical part comprises a setting part configured to set a start point of the certain period based at least in part on the read-out time information,
    wherein the read-out time information is the delay time of each of the plurality of data transmitters, the data reception device outputs a control signal for indicating the certain period, and the setting part delays the control signal input from the memory controller in accordance with the value of the delay time, and
    wherein the physical part comprises a first clock, and the setting part has a first adjusting part configured to provide the control signal with a delay amount of a half period or more of the first clock and a second adjusting part configured to provide the control signal with a delay amount smaller than the half period of the first clock.

9. The data reception according to claim 8, wherein the setting part increases the delay amount of the control signal in accordance with increase of the delay time, and reduces the delay amount of the control signal in accordance with decrease of the delay time.

10. The data reception according to claim 8, wherein the physical part comprises a terminating part, configured to connect a terminal, to which the data is input, to a terminating resistor in accordance with the control signal delayed by the setting part.

11. A data reception device being connectable to a data transmission equipment including a plurality of data transmitters, the data reception device comprising:
   a data reception controller configured to instruct read-out of data of the data transmission equipment; and
   a physical part configured to terminate a read-out signal for a certain period containing an arrival time of data read out from one data transmitter of the data transmission equipment in accordance with a read-out instruction from the data reception controller but not a part of a delay time from the read-out instruction until the data read-out of at least one other data transmission device,
   wherein the physical part comprises read-out time information for each of the plurality of data transmitters,
   wherein the physical part comprises a setting part configured to set a start point of the certain period based at least in part on the read-out time information,
   wherein the read-out time information is the delay time of the each of the plurality of data transmitters, the data reception controller outputs a control signal for indicating the certain period, and the setting part delays the control signal input from the data reception controller in accordance with the value of the delay time, and
   wherein the physical part comprises a dummy clock part configured to provide a clock delay to the control signal input from the data reception controller and supplies the memory device equipment with the control signal which is provided with the clock delay.

12. The data reception device according to claim 11, wherein the setting part increases the delay amount of the control signal in accordance with increase of the delay time, and reduces the delay amount of the control signal in accordance with decrease of the delay time.

13. The data reception device according to claim 11, wherein the physical part comprises a terminating part configured to connect a terminal, to which the data is input, to a terminating resistor in accordance with the control signal delayed by the setting part.

* * * * *